(12) United States Patent
Regan et al.

(10) Patent No.: US 10,617,064 B2
(45) Date of Patent: Apr. 14, 2020

(54) PLANT PHENOTYPING TECHNIQUES USING MECHANICAL MANIPULATION, AND ASSOCIATED SYSTEMS AND METHODS

(71) Applicant: X Development LLC, Mountain View, CA (US)

(72) Inventors: William Regan, San Carlos, CA (US); Benoit Schillings, Los Altos Hills, CA (US); David Brown, San Francisco, CA (US); Matthew Bitterman, Mountain View, CA (US); Christopher Van Arsdale, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 206 days.

(21) Appl. No.: 15/855,936

(22) Filed: Dec. 27, 2017

(65) Prior Publication Data

US 2019/0191631 A1 Jun. 27, 2019

(51) Int. Cl.
*A01G 7/00* (2006.01)
*G06T 7/00* (2017.01)
(Continued)

(52) U.S. Cl.
CPC .............. *A01G 7/00* (2013.01); *A01B 76/00* (2013.01); *A01G 22/00* (2018.02); *B64C 39/024* (2013.01);
(Continued)

(58) Field of Classification Search
CPC .......... A01B 76/00; A01G 22/00; A01G 7/00; B64C 39/024; B64C 2201/027; B64C 2201/108; B64C 2201/127; B64D 47/08; G06T 7/0004; G06T 7/0012; G06T 7/20; G06T 2207/10116; G06T 2207/10132; G06T 2207/30188

See application file for complete search history.

(56) References Cited

U.S. PATENT DOCUMENTS

| | | | | |
|---|---|---|---|---|
| 5,077,934 A | * | 1/1992 | Liboff | A01G 7/04 47/1.3 |
| 7,918,078 B2 | | 4/2011 | Poggiagliolmi et al. | |

(Continued)

FOREIGN PATENT DOCUMENTS

CN 202842052 U * 4/2013

OTHER PUBLICATIONS

Jemej Polajnar et al., "Resonance in herbaceous plant stems as a factor in vibrational communication of pentatomid bugs (Heteroptera: Pentatonnidae)", J R Soc Interface, published 2012 (Year: 2012).*

(Continued)

*Primary Examiner* — Mekonen T Bekele
(74) *Attorney, Agent, or Firm* — Christensen O'Connor Johnson Kindness PLLC

(57) ABSTRACT

Systems and methods for plant phenotyping using mechanical manipulation are disclosed. In one embodiment, a method for plant phenotyping includes: agitating a plant with an agitator; acquiring images of the plant with a camera while agitating the plant; and analyzing the images of the plant to determine properties of the plant. The plant may be at least partially agitated at a resonance frequency of oscillation of a stalk of the plant.

19 Claims, 7 Drawing Sheets

(51) Int. Cl.
*G06T 7/20* (2017.01)
*B64C 39/02* (2006.01)
*A01B 76/00* (2006.01)
*B64D 47/08* (2006.01)
*A01G 22/00* (2018.01)

(52) U.S. Cl.
CPC ............ *B64D 47/08* (2013.01); *G06T 7/0004* (2013.01); *G06T 7/0012* (2013.01); *G06T 7/20* (2013.01); *B64C 2201/027* (2013.01); *B64C 2201/108* (2013.01); *B64C 2201/127* (2013.01); *G06T 2207/10116* (2013.01); *G06T 2207/10132* (2013.01); *G06T 2207/30188* (2013.01)

(56) References Cited

U.S. PATENT DOCUMENTS

| | | | |
|---|---|---|---|
| 10,492,374 B2* | 12/2019 | Regan | G06K 9/6256 |
| 2015/0015697 A1* | 1/2015 | Redden | G01N 33/0098 |
| | | | 348/89 |
| 2016/0216245 A1 | 7/2016 | Sutton | |
| 2017/0127606 A1 | 5/2017 | Horton | |
| 2017/0161560 A1 | 6/2017 | Itzhaky et al. | |
| 2017/0223947 A1 | 8/2017 | Gall et al. | |
| 2017/0228118 A1 | 8/2017 | Sugumaran et al. | |
| 2017/0251589 A1 | 9/2017 | Tippery et al. | |
| 2018/0313760 A1* | 11/2018 | Kramer | G01N 21/6456 |
| 2019/0191630 A1* | 6/2019 | Regan | A01G 22/00 |
| 2019/0191632 A1* | 6/2019 | Regan | A01G 7/00 |
| 2019/0200535 A1* | 7/2019 | Regan | B64C 39/024 |

OTHER PUBLICATIONS

Hanns-Christof Spatz, Olga Speck, "Oscillation frequencies of tapered plant stems" American Journal of Botany / vol. 89, Issue 1, published on 2002 (Year: 2002).*

* cited by examiner

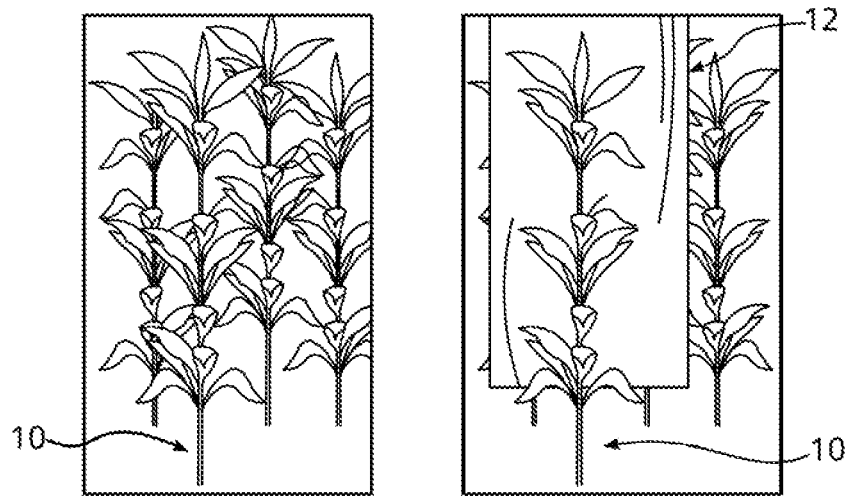
FIG. 1A
(PRIOR ART)
FIG. 1B
(PRIOR ART)
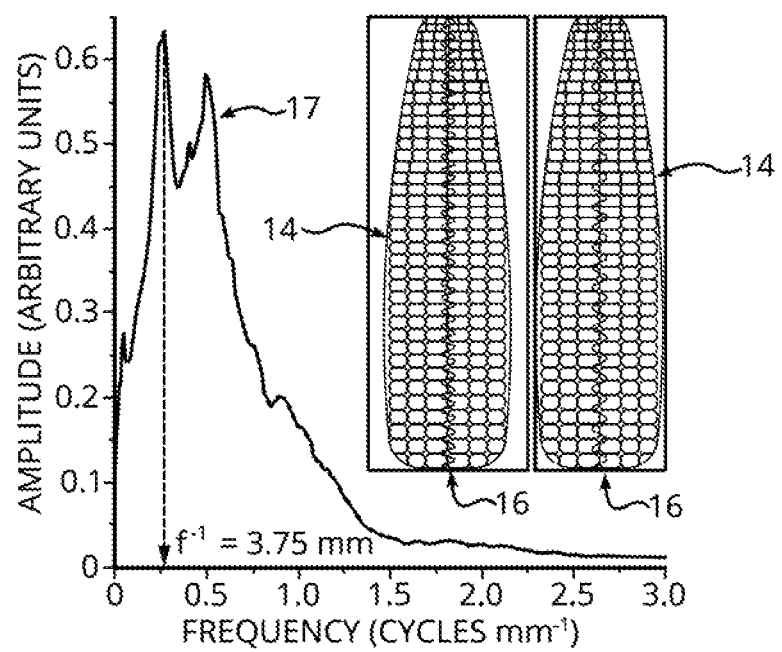
FIG. 1C
(PRIOR ART)

PLANT PHENOTYPING TECHNIQUES USING MECHANICAL MANIPULATION, AND ASSOCIATED SYSTEMS AND METHODS

CROSS REFERENCE TO RELATED APPLICATIONS

The present application is related to a U.S. application entitled "Improved Plant Phenotyping Techniques Using Optical Measurements, and Associated Systems and Methods,". U.S. patent application Ser. No. 15/855,955, filed Dec. 27, 2017.

BACKGROUND

Plants are periodically evaluated in-field to estimate their size, stage of growth, sufficiency of watering, size of the fruit, presence/absence of pests or disease, or other observable traits or characteristics. Such evaluation of the plants is referred to as phenotyping.

FIG. 1A is a picture of plants obtained in accordance with conventional technology. With some conventional technologies, the in-field phenotyping involves acquiring optical images of the plants. These images are subsequently analyzed to establish relevant properties of the plants, for example, size of the plant, size of the fruit, etc. In many applications, the subsequent treatments of the plants (e.g., watering, application of pesticides, harvesting, etc.) is decided based on the analysis of the images. However, conventional imaging generates a large volume of relatively incomplete or difficult-to-analyze data. For example, the parts of plants may be occluded or obscured such that the relevant plant properties are difficult to derive from the images. Therefore, trained operators sometimes physically separate (physically "segment") a plant 10 from the rest of the plants to make the outline of the plant 10 sharper and, thus, more suitable for the subsequent analysis of the acquired image. However, such an individualized treatment of the target plants increases the cost and time of the in-field phenotyping.

FIG. 1B is a picture of the plant 10 obtained in accordance with conventional technology. With the illustrated conventional technology, a physical backdrop 12 is placed behind the plant 10 to improve the isolation/contrast of the plant 10 against other plants in the field, therefore improving the sharpness of the image. As a result, the analysis of the image of the plant 10 is more accurate. However, the placement of the physical backdrops increases the time required for acquiring images and the cost of the phenotyping.

FIG. 1C is a graph of plant phenotyping results obtained with conventional technology. With some conventional technologies, the internal or otherwise occluded plant features can be exposed by the operators prior to imaging these plant features. For example, the operator may remove the husk that hides the corn ear structure prior to imaging corn kernels 14. Once a relatively sharp outline of the corn kernels 14 is imaged, the size of the corn kernels may be obtained by fitting a suitable periodic curve 16 having amplitude and period that approximates the size of the corn kernels. Next, the curves 16 can be represented as a frequency-amplitude graph 17. In the illustrated example, one or more peaks in the graph 17 correspond to the dominant or the average length of the corn kernels 14. However, this conventional technology results in a physical destruction of the corn ear structure that is evaluated.

Accordingly, there remains a need for in-field plant phenotyping techniques and system having a high-throughput and low cost of acquiring the images that can be analyzed to produce accurate data about the plants under review.

DESCRIPTION OF THE DRAWINGS

The foregoing aspects and many of the attendant advantages of the inventive technology will become more readily appreciated as the same become better understood by reference to the following detailed description, when taken in conjunction with the accompanying drawings, wherein:

FIG. 1A (Prior Art) is a picture of a plant obtained in accordance with conventional technology;

FIG. 1B (Prior Art) is a picture of a plant obtained in accordance with conventional technology;

FIG. 1C (Prior Art) is a is a graph of plant phenotyping results obtained with conventional technology;

DETAILED DESCRIPTION

While illustrative embodiments have been described, it will be appreciated that various changes can be made therein without departing from the spirit and scope of the inventive technology. Embodiments of the inventive technology are generally applicable to in-field estimates of the plant attributes, for example, size, stage of growth, sufficiency of watering, presence/absence of pests or disease, etc.

In some embodiments, a ground vehicle carries an agitator, a camera and an image analysis system. In operation, the agitator (e.g., a mechanical arm, an air blower, an air fan, etc.) may shake the plant to segment (separate) the plant or the parts of the plant from the surrounding plants that obscure or occlude the plant of interest. As a result, the camera can capture a more representative and complete image of the plant of interest for a subsequent analysis by the image analysis system. The ground vehicle may also carry an image analysis system (e.g., a digital computer), with an interface (e.g., a wireless link interface), for receiving plant images from the camera.

In some embodiments, the agitator shakes a plant at a frequency corresponding to the plant's resonant frequency, while the camera acquires images at an integer multiple or an integer fraction of the resonant frequency, thus capturing multiple images of the plant in the same position or close to the same position. A range of motion (e.g., the amplitude of the oscillation) for the plant that vibrates at its resonant frequency is related to physical properties of the plant, for example, strength or stiffness of the stalk, mass of the plant, distribution of the fruits, density and size of the leaves, etc.

Therefore, in at least some embodiments, the properties of the plant that vibrates at its resonant frequency may be evaluated more accurately and/or faster.

In some embodiments, an unmanned aerial vehicle (UAV) may direct jets of air toward the plants by, for example, hovering in the vicinity of the plant, and orienting some of the propellers toward the plants. In some embodiments, the propellers may produce intermittent puffs of air directed to the plants. The UAVs may carry one or more cameras or may rely on the ground based cameras.

Figure 2:
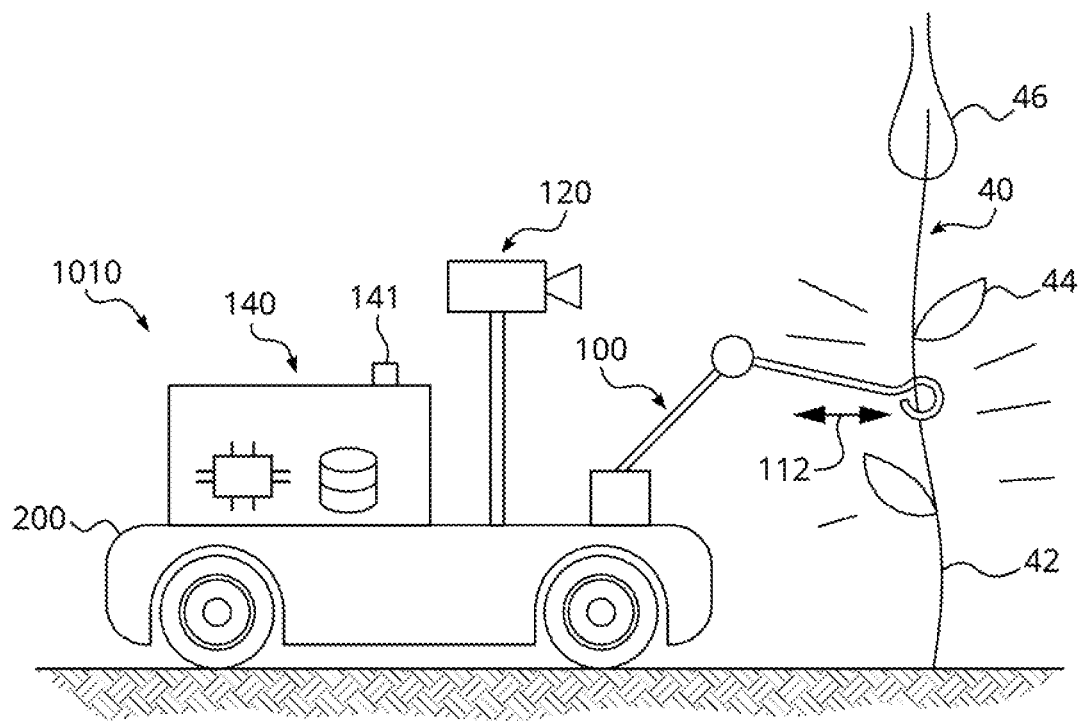
FIGS. 2 and 3 are schematic views of ground vehicles operating in accordance with embodiments of the present technology.
Figure 3:
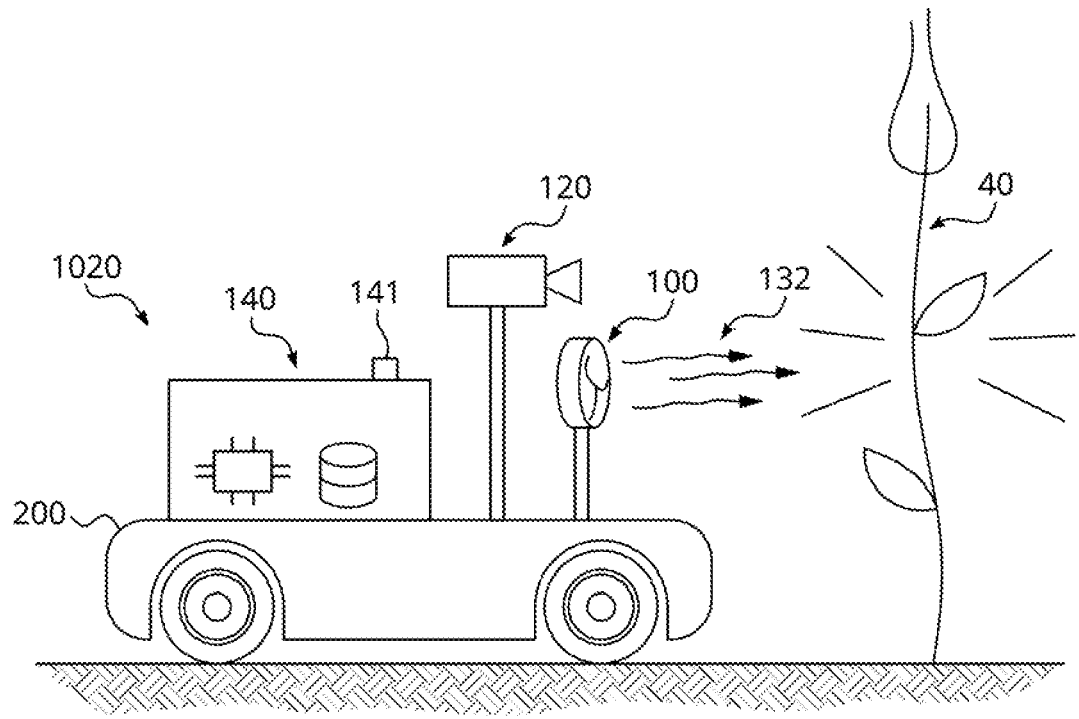

FIGS. 2 and 3 are schematic views of ground vehicles operating in accordance with embodiments of the present technology. FIG. 2 shows a ground vehicle system 1010 that includes a ground vehicle 200, a mechanical agitator 100, and a camera 120. In some embodiments, the ground vehicle system 1010 may include multiple cameras 120 and/or agitators 100. In some embodiments, the around vehicle 200 carries an analysis system 140, for example, a digital computer, for analyzing the images obtained by the camera 120. The ground vehicle may be an unmanned ground vehicle or an operator-driven vehicle. The analysis system may receive the images through a communication interface 141, for example, a wireless communication interface.

In operation, the agitator 100 shakes (agitates) a plant 40 to eliminate or at least reduce occlusion of the plant 40 or its parts (e.g., a stalk 42, leaves 44, a flower 46, etc.) by the surrounding plants. In different embodiments, the agitator may include different actuators, for example, a pneumatic cylinder, a hydraulic cylinder, a servo motor, a piezo-element, etc. As the agitator 100 shakes the plant, the camera 120 may take one or more images of the plant 40 or its parts. The camera may operate within the visible light spectrum, X-ray spectrum, etc., or the camera may be an ultrasound transceiver configured to transmit ultrasound waves toward the plant and to receive ultrasound waves reflected from the plant (i.e., acquire ultrasound images or spectrograms). The camera images are transmitted to the analysis system 140 that may be either carried by the ground vehicle 200 or located remotely.

FIG. 3 illustrates a ground vehicle system 1020 that includes a moving air agitator 100, for example, a fan or a blower. In operation, one or more agitators 100 direct air jets 132 toward the plant 40 to shake the plant. The agitators 100 may operate to provide continuous or intermittent air jets 132. In some embodiments, the intermittent jets may cause the plant to oscillate at the resonant frequency of the plant.

Figure 4:
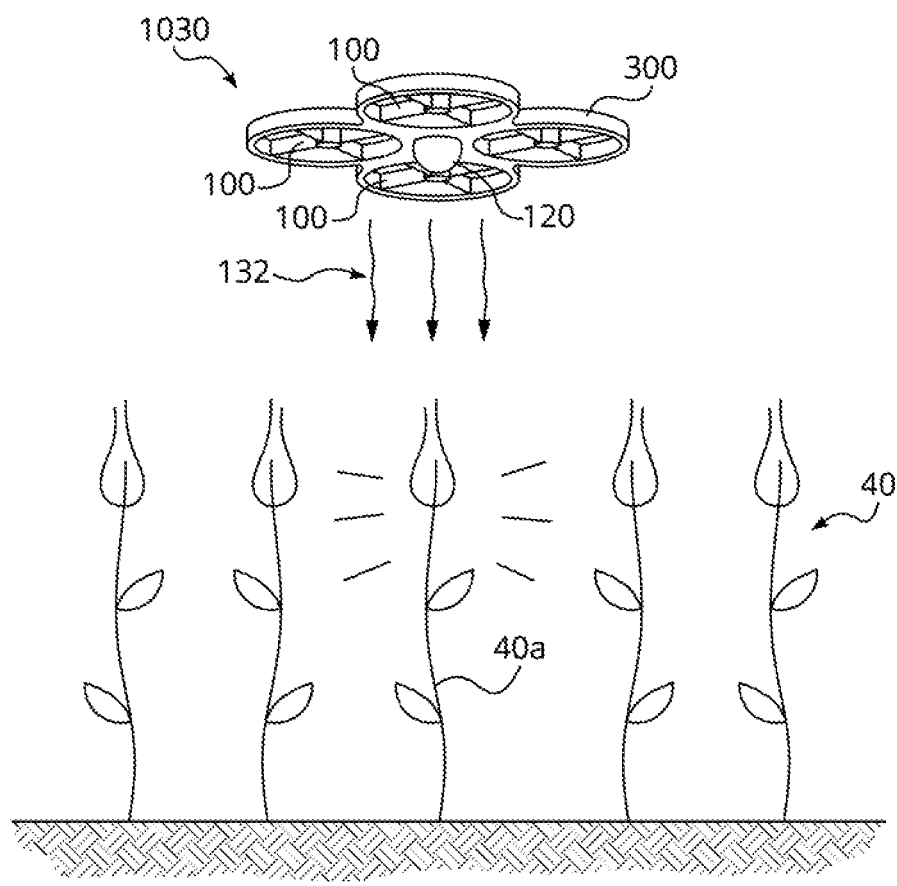
FIG. 4 is a schematic view of an air vehicle in operation in accordance with embodiments of the present technology.

FIG. 4 is a schematic view of an air vehicle in operation in accordance with embodiments of the present technology. In some embodiments, an air vehicle system 1030 includes a UAV 300 that carries the camera 120. In operation, the UAV may fly over the plants 40 or hover near the plants 40. For example, the UAV may hover above the plant 40a in the illustrated row of plants. The UAV may have multiple propulsion units (e.g., propellers) that are turned on and off to produce air jets 132 thus shaking the plant 40a to eliminate or at least reduce the occlusion of this plant. As a result, the camera 120 carried by the UAV and/or a ground-based camera acquires images of the less-occluded plant 40a. In some embodiments, the acquired images are sent wirelessly to the ground-based analysis system. In other embodiments, the images are stored on a storage unit carried by the UAV, and subsequently transferred to the ground-based analysis system.

Figure 5:
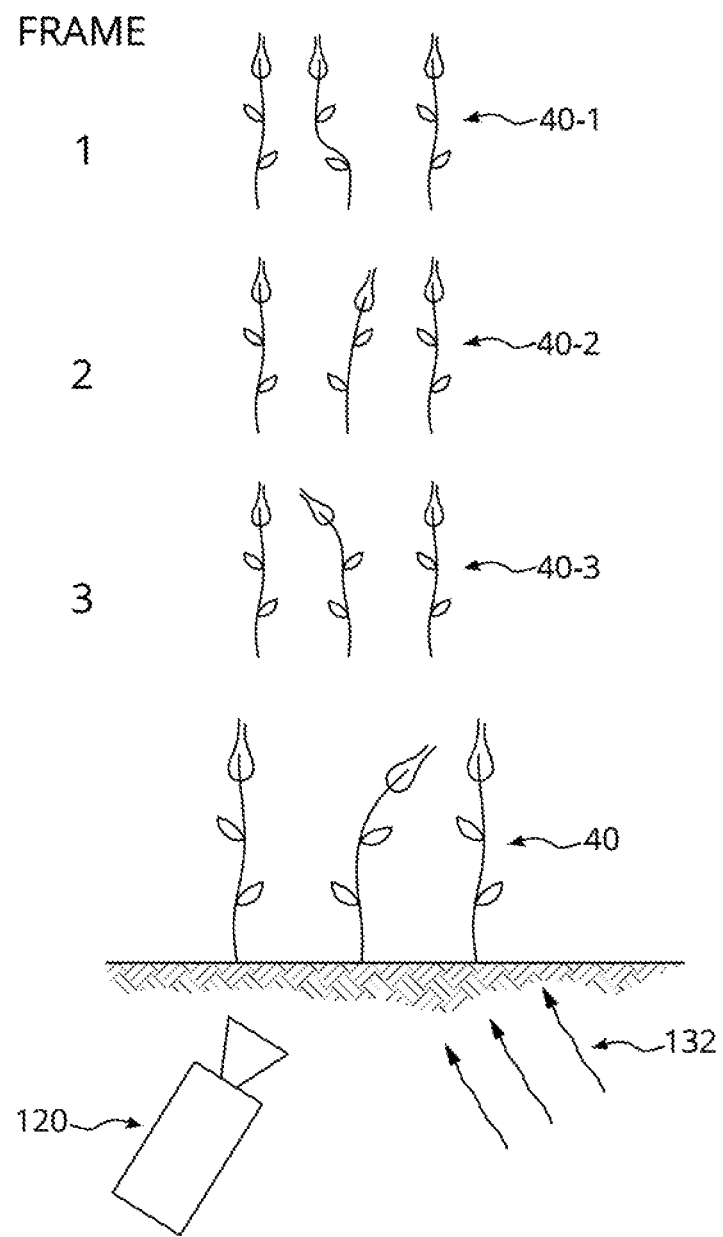
FIG. 5 is a schematic diagram of plant agitation in accordance with an embodiment of the present technology.

FIG. 5 is a schematic diagram of plant agitation in accordance with an embodiment of the present technology. The diagram includes several camera images (frames) acquired in succession by the camera 120. In the illustrated embodiment, the air jet 132 is directed toward the middle plant, therefore causing the middle plant to segment away from the surrounding plants, i.e., to separate the plant from the surrounding plants or from the occlusion by the surrounding plants, for improved visibility of the middle plant. The shaking (swaying) of the middle plant is, at least in part, function of the physical properties of the plant. For example, the resonance frequency of oscillation of a stalk of the plant may be determined by varying the oscillation of the agitator arm or the velocity of the air till the resonance of the plant is established. In some embodiments, an approximate resonant frequency of the plant may be determined based on the analysis of the images. Next, the agitator may shake the plant at a decreasing or increasing frequency to find the true resonant frequency of the plant. Some embodiments of the systems and methods for estimating the physical properties of the plants based on the images of the plants are described with reference to FIGS. 6-9 below.

Figure 6:
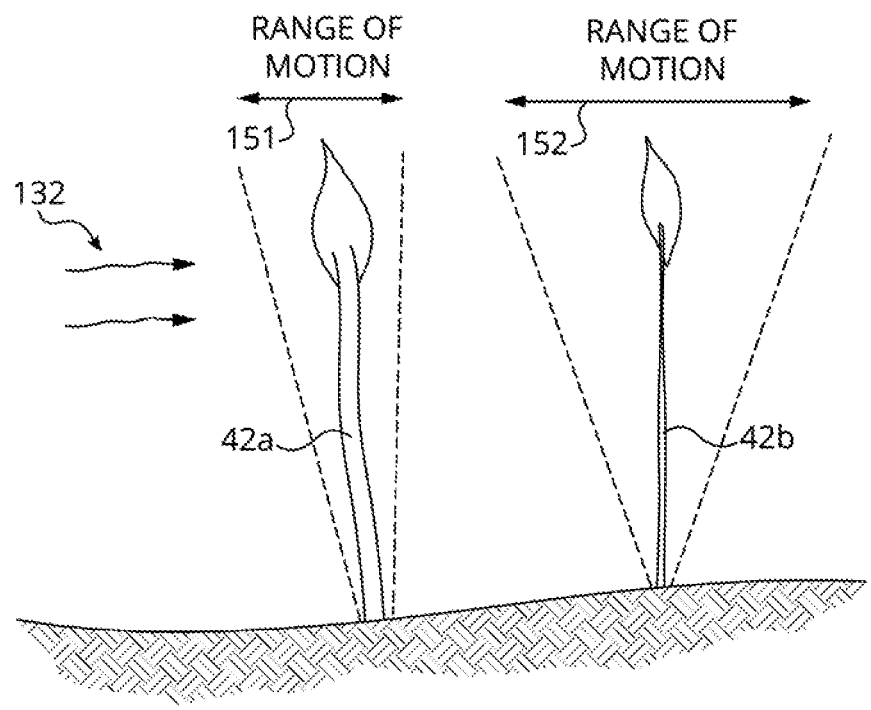
FIG. 6 is a schematic diagram of stalk agitation in accordance with an embodiment of the present technology.

FIG. 6 is a schematic diagram of stalk agitation in accordance with an embodiment of the present technology. In the illustrated embodiment, the agitation is caused by the air jet 132, but a mechanical agitator may be used in different embodiments. When subjected to the air jet 132, the stalks 42a and 42b oscillate within ranges of motion 151 and 152, respectively. In at least some embodiments, strength or rigidity of the stalk scales inversely proportionally with the range of motion. Therefore, when agitated by the same air jet 132, a relatively stiffer stalk 42a generally has a smaller range of motion than does more flexible or less stiff stalk 42b. Analogous observations can be made when the mechanical agitators are used. As a result, the strength of the stalk may be estimated based on the analysis of the images obtained by the camera. In some embodiments, root lodging of the plants correlates with the stalk strength, because stalks that are stronger are less prone to large wind- or rain-induced swings that, in turn, cause lodging.

Figure 7:
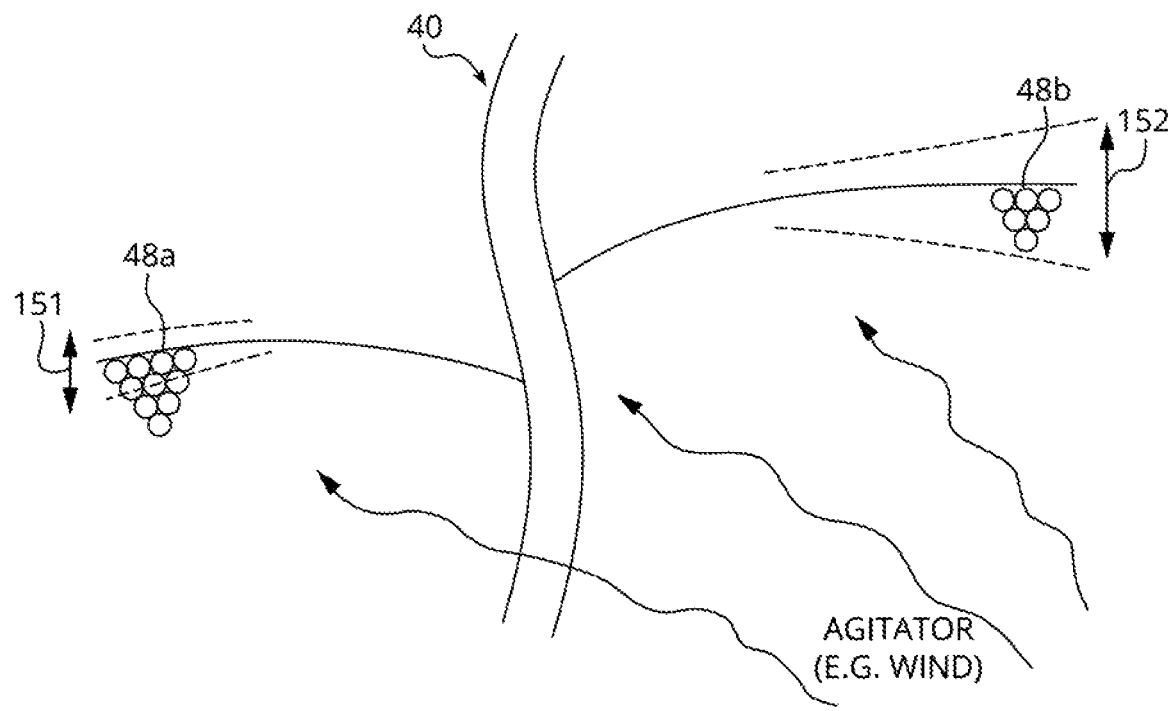
FIG. 7 is a schematic diagram of branch agitation in accordance with an embodiment of the present technology.

FIG. 7 is a schematic diagram of branch agitation in accordance with an embodiment of the present technology. In the illustrated embodiment, an agitator (e.g., a mechanical agitator, a blower, etc.) agitates the plant 40, including fruits 48a and 48b. In response to agitation, the fruits 48a and 48b oscillate within ranges of motion 151 and 152, respectively. Assuming similar properties of the branches, heavier fruit will have generally smaller range of motion 151, and lighter fruit will have generally larger range of motion 152 when both are subjected to the same agitation. As a result, the mass of the fruit may be estimated based on the analysis of the range of motion in the images.

Figure 8:
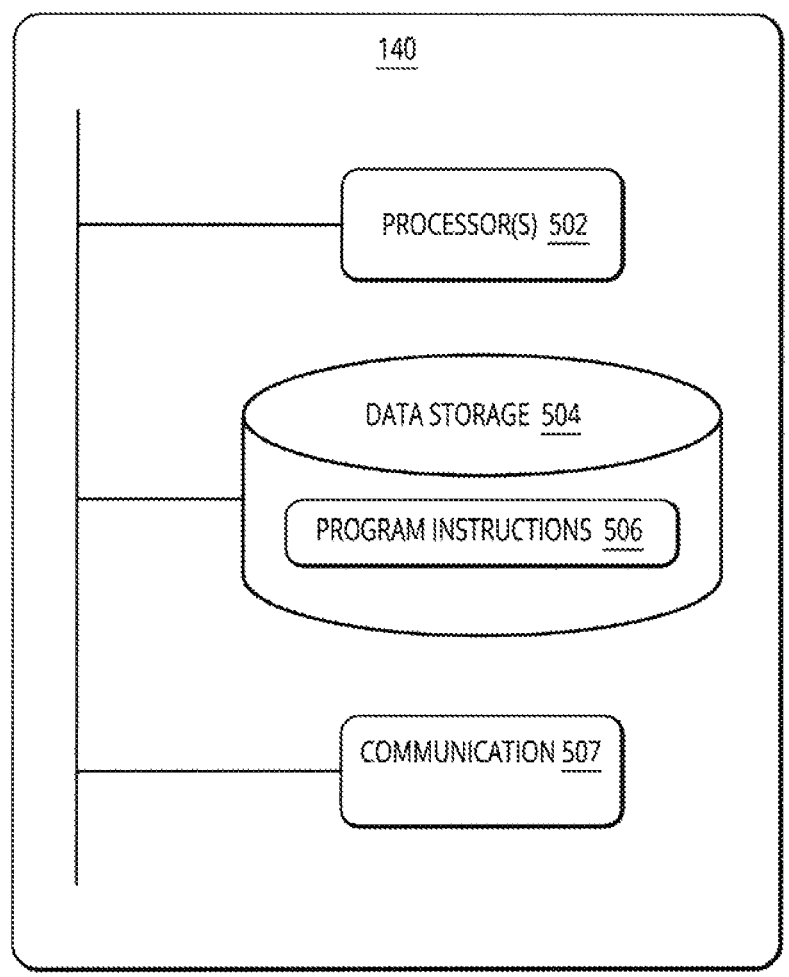
FIG. 8 is a schematic view of an analysis system in accordance with an embodiment of the present technology.

FIG. 8 is a schematic view of an analysis system in accordance with an embodiment of the present technology. In some embodiments, the analysis system 140 includes one or more processors 502 and a data storage 504, such as a non-transitory computer readable medium. The data storage 504 may store program instructions 506, which may be executable by the processor(s) 502. The analysis system 140 may include the communication interface 141 for communication with the camera. In different embodiments, the various components of the analysis system 140 may be arranged and connected in different manner.

Figure 9:
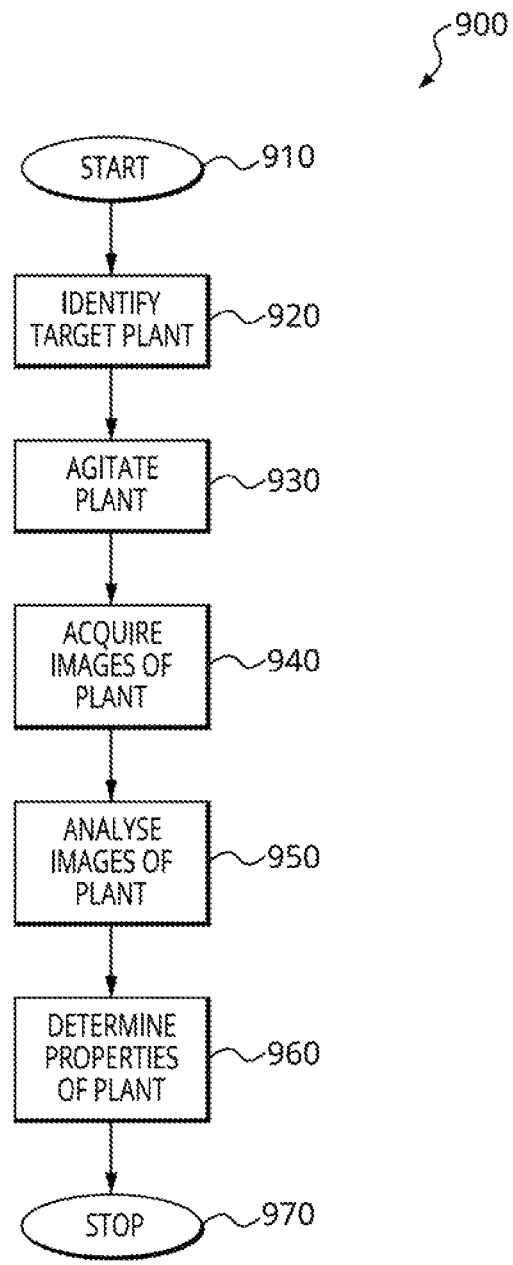
FIG. 9 is a flow diagram of a method for plant phenotyping in accordance with an embodiment of the present technology.

FIG. 9 is a flow diagram of a method 900 for plant phenotyping in accordance with an embodiment of the present technology. In some embodiments, the method may include additional steps or may be practiced without all steps illustrated in the flow chart. Furthermore, in some embodiments, the order of the steps listed may be changed.

The method starts in block 910, and continues to block 920. In block 920, a target plant is identified and targeted for agitation and image acquisition. In some embodiments, a particular part of the plant, for example, the stalk, may be targeted for agitation and image acquisition.

In block 930, the plant is agitated using, for example, a mechanical agitator or a moving air agitator. In some embodiments, multiple agitators may be used to agitate one or more plants. In some embodiments, mechanical and moving air agitators may be combined in operation.

In block 940, the camera acquires one or more images of the plant. In some embodiments, the camera may operate in a visible spectrum, in an X-ray spectrum, in the ultrasound spectrum, etc. In some embodiments, the plant is agitated at its resonance frequency, while the rate of image acquisition corresponds to an integer multiple of the resonance frequency of the plant (e.g. 2×, 3×, etc. of the resonance frequency) or an integer fraction of the resonance frequency of the plant (e.g., ½, ⅓, ¼, of the resonance frequency). For example, if the rate of image acquisition is twice the resonant frequency, half of the images captures the plant in one position, and half of the images captures the image plant in another position. As another example, if the rate of image acquisition corresponds to one third of the resonant frequency of the plant, the plant is captured at the same position in every image, where every image captures the third consecutive oscillation of the plant. In at least some embodiments, when the plant remains in the same or close position in multiple images, analysis of the properties of the plant can be more precise and/or faster.

In block 950, the analysis system analyses the acquired images. In some embodiments, the images may be wirelessly transferred from the camera to the analysis system. The analysis system may include digital computers, frequency analyzers, oscilloscopes, software for image analysis, data storage units, etc. In some embodiments, the ground vehicle may carry the analysis system together with the agitator and the camera. In other embodiments, the analysis system may be separate from the ground vehicle.

In block 960, one or more properties of the plant are determined based on the analysis of the images. Some examples of such properties are size of the plant, strength of the stalk, size of the leaves, mass of the fruit, presence of plant lodging, etc. The method ends in block 970.

Many embodiments of the technology described above may take the form of computer-executable or controller-executable instructions, including routines stored on non-transitory memory and executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. In many embodiments, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A method for plant phenotyping, comprising:
   agitating a plant with an agitator;
   acquiring images of the plant with a camera while agitating the plant;
   analyzing the images of the plant to determine properties of the plant;
   determining a resonance frequency of oscillation of a stalk of the plant while agitating the plant;
   agitating the stalk at the resonance frequency of oscillation of the stalk of the plant; and
   determining a mass of a fruit based on a frequency of oscillation of the fruit while agitating the stalk.

2. The method of claim 1, wherein an image acquisition rate of the camera corresponds to an integer multiple or an integer fraction of the resonance frequency of oscillation of the stalk.

3. The method of claim 2, further comprising determining a stiffness of the stalk based on the resonance frequency of oscillation of the stalk or a deflection amplitude of oscillation.

4. The method of claim 1, wherein agitating the plant segments the plant from surrounding plants.

5. The method of claim 4, further comprising:
   based on analyzing the images, estimating a range of motion of the plant; and
   based on the range of motion of the plant, estimating a stiffness of a stalk of the plant.

6. The method of claim 1, wherein the agitator is a mechanical agitator in direct contact with the plant.

7. The method of claim 1, wherein the agitator is a moving air agitator.

8. The method of claim 1, wherein the agitator and the camera are mounted on a ground vehicle.

9. The method of claim 1, wherein the agitator and the camera are mounted on an unmanned air vehicle (UAV).

10. The method of claim 9, wherein the agitator at least partially corresponds to a propulsion of the UAV.

11. A system for plant phenotyping, comprising:
    a vehicle that carries:
      an agitator configured to agitate a plant at a resonance frequency of oscillation of a stalk of the plant;
      a camera configured to acquire images of the plant while agitating the plant with the agitator, wherein an image acquisition rate of the camera corresponds to an integer multiple or an integer fraction of the resonance frequency of oscillation of the stalk; and
      a communication interface configured to transmit the images to an image analysis system configured to determine at least one property of the plant.

12. The system of claim 11, further comprising the image analysis system configured to receive images from the communication interface.

13. The system of claim 11, wherein the camera is a digital camera operating in a visible light spectrum.

14. The system of claim 11, wherein the camera is a digital camera operating in an X-ray spectrum.

15. The system of claim 11, wherein the camera is an ultrasound transceiver configured to transmit ultrasound waves toward the plant and to receive ultrasound waves reflected from the plant.

16. The system of claim 11, wherein the vehicle is a ground vehicle.

17. The method of claim 11, wherein the agitator is a mechanical agitator.

18. The method of claim 11, wherein the agitator is a moving air agitator.

19. The system of claim 11, wherein the vehicle is an unmanned aerial vehicle (UAV), and wherein the agitator at least partially corresponds to a propulsion of the UAV.

* * * * *